United States Patent [19]
Lin

[11] Patent Number: 5,156,084
[45] Date of Patent: Oct. 20, 1992

[54] FOOD PROCESSOR

[75] Inventor: Wen-Hsiung Lin, Taipei, Taiwan

[73] Assignee: Waying-HHS Taiwan, Ltd., Taipei, Taiwan

[21] Appl. No.: 857,762

[22] Filed: Mar. 26, 1992

[51] Int. Cl.[5] ................ A47J 43/04; B01D 33/00
[52] U.S. Cl. .................................. 99/495; 99/484;
  99/511; 210/380.1; 241/168; 241/169.1;
  366/130; 366/279
[58] Field of Search ............... 99/495, 510-513,
  99/484, 536, 537, 538; 210/360.1, 380.1, 474,
  477; 241/168, 169, 169.1; 366/129, 130, 279

[56] References Cited

U.S. PATENT DOCUMENTS

| | | | |
|---|---|---|---|
| 3,684,099 | 8/1972 | Kiebach | 210/380.1 |
| 3,741,104 | 6/1973 | Kannegiesser | 241/168 |
| 4,010,934 | 3/1977 | McCord et al. | 366/130 |
| 4,114,286 | 9/1978 | Bingham | 99/495 |
| 4,523,993 | 6/1985 | Farber | 210/380.1 |
| 4,591,104 | 5/1986 | Bounds | 241/169.1 |
| 4,702,162 | 10/1987 | Sontheimer et al. | 99/495 |
| 4,840,119 | 6/1989 | Caldi | 99/513 |
| 4,958,557 | 9/1990 | Fiala | 99/495 |
| 5,007,591 | 4/1991 | Daniels, Jr. | 241/169.1 |
| 5,064,535 | 11/1991 | Hsu | 210/380.1 |

FOREIGN PATENT DOCUMENTS

| | | | |
|---|---|---|---|
| 2653679 | 6/1977 | Fed. Rep. of Germany | 366/130 |
| 8906106 | 7/1989 | PCT Int'l Appl. | 99/513 |
| 9105502 | 5/1991 | PCT Int'l Appl. | 99/495 |

Primary Examiner—Timothy F. Simone
Attorney, Agent, or Firm—Poms, Smith, Lande & Rose

[57] ABSTRACT

A food processor comprises a work bowl with a central support axle extending from the bottom thereof part way to the top opening thereof and a cover having a crank handle rotatably fixed on an outer surface thereof to drive a gear train disposed in an interior formed inside the cover which in turn drives a spindle extending from an inner surface thereof into the work bowl. The food processor further comprises a drainer basket which is supported on the central support axle and rotated by the spindle to drain vegetables and/or fruits disposed therein when the crank handle is manually rotated, a slicer member having a plurality of slicing blades radially disposed on a central shaft at different altitude thereof, and a mixer member having a triangular and a rectangular mixing blades diametrically oppositely mounted on a central shaft with a plurality of passages formed thereon. The drainer basket, the slicer member and a mixer member can be alternately used to process food in different ways. A seasoning opening may also be provided on the cover for disposing seasoning and/or vegetable oils into the work bowl.

8 Claims, 3 Drawing Sheets

FOOD PROCESSOR

FIELD OF THE INVENTION

The present invention relates generally to a food processor and in particular to a multi-function manually-operated food processor.

BACKGROUND OF THE INVENTION

Due to the nature of cooking, kitchenware has been developed to be so various and so distinctive in function that there are usually many single-purpose cooking and/or food processing devices existing in a kitchen, such as slicing means, mixing means, drainer, etc. This may be good for professional cooks or chefs for the kitchenware is handy and convenient. However, for home kitchens, these devices may take too much space in storage, for most of the time most of the kitchenware are not in use. In that case, a multi-purpose food processing device may prove useful in doing food processing while occupying less space in storage.

Besides, although using electricity to replace human power is a symbol of modernization and as a matter of fact the conventionally manually-operated kitchenware is gradually replaced by electrically-operated devices. Although, this can save time and labor in doing food processing or cooking, it causes problems of cleaning, for water in generally is electrically conductive and may result in short circuit when the electrical devices are cleaned with water. For example, Taiwan patent publication number 27,853 discloses a multi-purpose food processor which can be used to juice vegetable and/or fruit with a cutter blade and a strainer basket or which can be alternately used to make food pastes with the cutter blade and a paste bowl. This prior art food processor is electrically operated and has a complicated arrangement. The disadvantage of the prior art food processor is that it is quite difficult in cleaning and it can be damaged by water leaking into the electrical driving parts thereof.

It is therefore desirable to have a food processor which is manually operated but taking only little labor in processing food.

OBJECTS OF THE INVENTION

It is therefore an object of the present invention to provide a food processor having the functions of slicing, mixing and draining.

It is another object of the present invention to provide a food processor which is easily and efficiently operated with little human power.

It is a further object of the present invention to provide a food processor having a plurality slicing blades radially disposed at different altitudes to enhance the slicing effect.

It is a further object of the present invention to provide a food processor having two mixing blades diametrically opposite to each other, one being substantially triangular and the other substantially rectangular and both having passages formed thereon to enhance mixing food.

To achieve the above-mentioned objects, there is provided a food processor comprising a work bowl with a central support axle extending from the bottom thereof part way to the top opening thereof and a cover having a crank handle rotatably fixed on an outer surface thereof to drive a gear train disposed in an interior formed inside the cover which in turn drives a spindle extending from an inner surface thereof into the work bowl. The food processor further comprises a drainer basket which is supported on the central support axle and rotated by the spindle to drain vegetables and/or fruits disposed therein when the crank handle is manually rotated, a slicer member having a plurality of slicing blades radially disposed on a central shaft at different altitude thereof, and a mixer member having a triangular and a rectangular mixing blades diametrically oppositely mounted on a central shaft with a plurality of passages formed thereon. The drainer basket, the slicer member and a mixer member can be alternately used to process food in different ways. A seasoning opening may also be provided on the cover for disposing seasoning and/or vegetable oils into the work bowl.

Other objects and advantages of the invention will be apparent from the following description of the preferred embodiments taken in connection with the accompanying drawings wherein:

DESCRIPTION OF OPERATION PRINCIPLE

Figure 1:
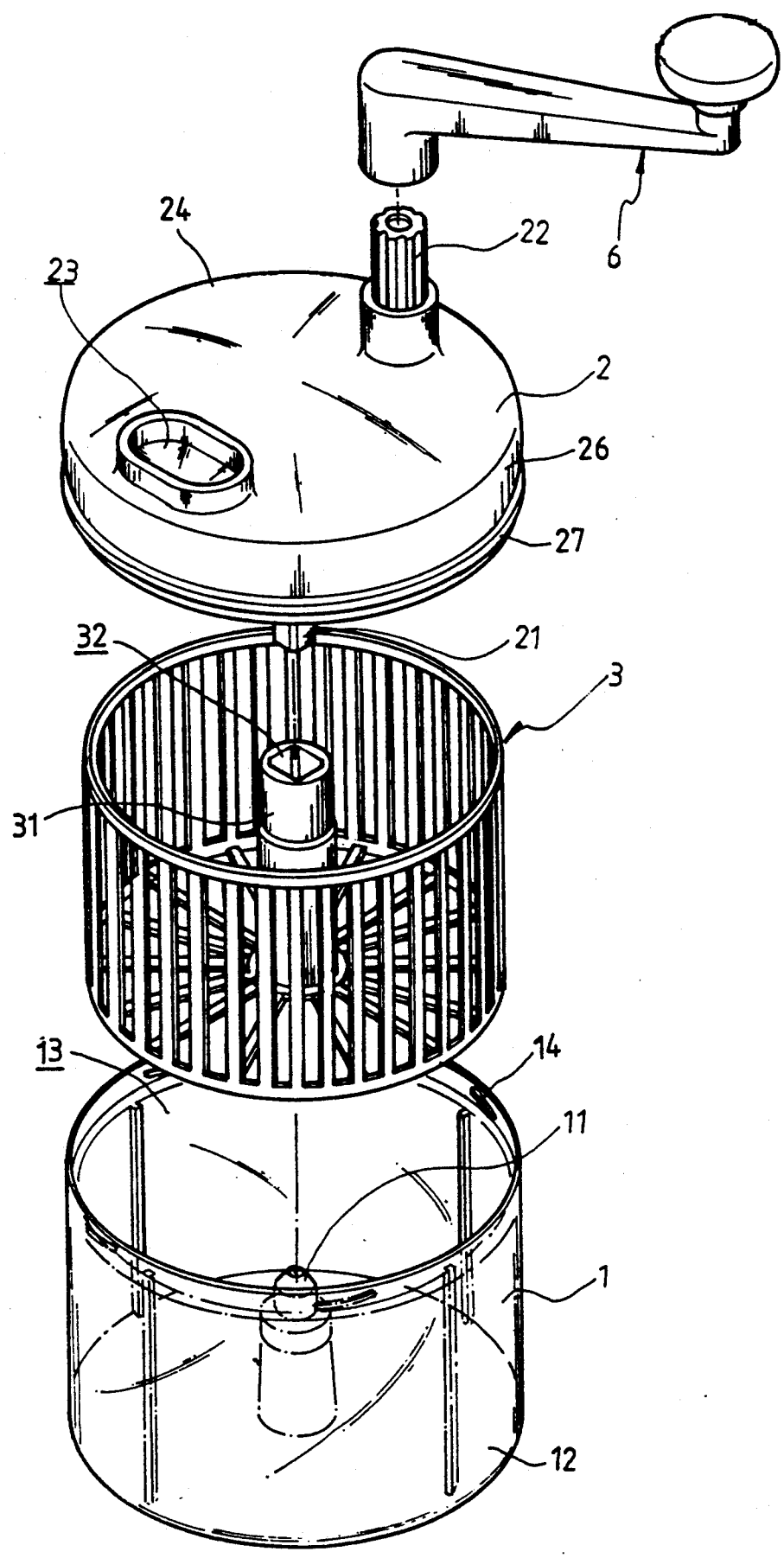
FIG. 1 is a perspective view of the food processor in accordance with the present invention with the drainer basket being in use.
Figure 2:
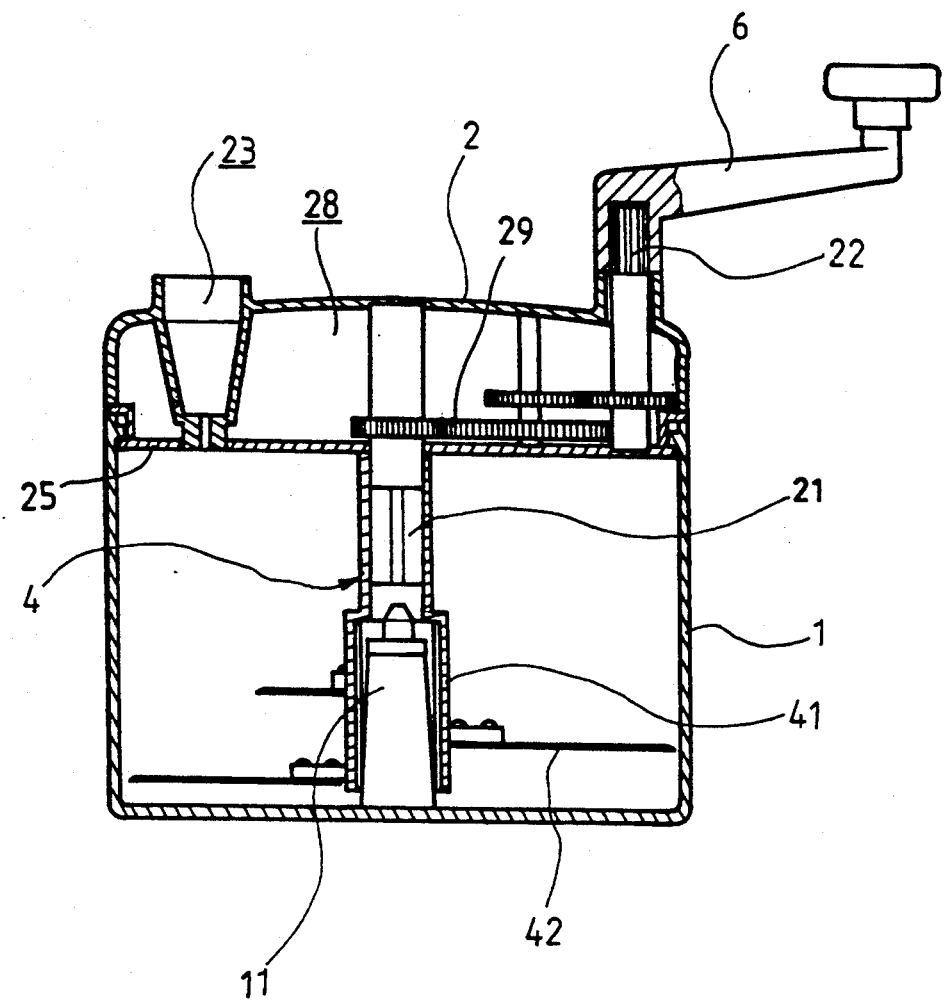
FIG. 2 is a cross-sectional view of the food processor shown in FIG. 1 with the drainer basket of FIG. 1 replaced with a slicer member.

Referring to the drawings and in particular to FIGS. 1 and 2, a food processor in accordance with the present invention comprises a work bowl 1 having a bottom 12 and a top opening 13 with strip-like fastening members 14 formed thereon and a cover 2 having an outer surface 24, an inner surface 25 and a side surface 26 connecting the outer and inner surfaces together with circumferential slots or projections 27 formed thereon to be secured by the fastening member 14 of the work bowl 1 when the cover 2 is placed and fastened on the top opening 13 of the bowl 1. The work bowl 1 also has a central support axle 11 extending from the bottom 12 part way to the top opening 13 to support and guide the rotation of a drainer basket 3 or a slicer member 4 (see FIGS. 2 and 3) or a mixer member 5 (see FIG. 4). It should be noted that the fastening or securing means 13 and 27 can be replaced with means having equivalent function and this can be easily done by those skilled in the art.

A seasoning opening 23 may be provided on the cover 2 for disposing seasoning and/or vegetable oils into the work bowl 1 when food is processed by the food processor of the present invention.

The outer, inner and side surfaces 24, 25 and 26 of the cover 2 constitute an interior 28 inside which a speed reduction gear train 29 is disposed to transmit rotation between a handle shaft 22 and a central spindle 21. Gear trains of this type have been well known to those skilled in the art of mechanical engineering and thus no detail of the gear train 29 will be described hereinafter. The handle shaft 22 extends from the interior 28 of the cover 2 toward the outer surface 24 thereof and protrudes out of the outer surface 24 to have a first end thereof, which has a plurality of axially directed recesses formed thereon, detachably engaged by a crank handle 6. The engagement of this type and the structure of the crane handle 6 are also known to those skilled in the art of mechanically engineering and no further description will be given hereinafter. The central spindle 21 extends from the interior 28 toward the inner surface 25 of the cover 2 and protrudes out of the inner surface 25 to have a first end thereof having a polygonal cross section extend into the work bowl 1.

To get off water from vegetables and/or fruits (not shown), the present invention provides a drainer basket 3 of which the shape and size are generally complementary to the work bowl 1 so as to be disposed in the work bowl 1 and supported by the central support axle 11 thereof. The drainer basket 3 has a central column 31 having an upper opening 32 complementary in shape and size to the polygonal cross-sectioned end of the central spindle 21 so as to be engageable therewith and rotated thereby. By rotating the crank handle 6, the central spindle 21 is rotated through the gear train 29 and in turn rotates the drainer basket 3 to have the vegetables and/or fruits (not shown) disposed therein drained by centrifugal force and gravity.

Figure 3:
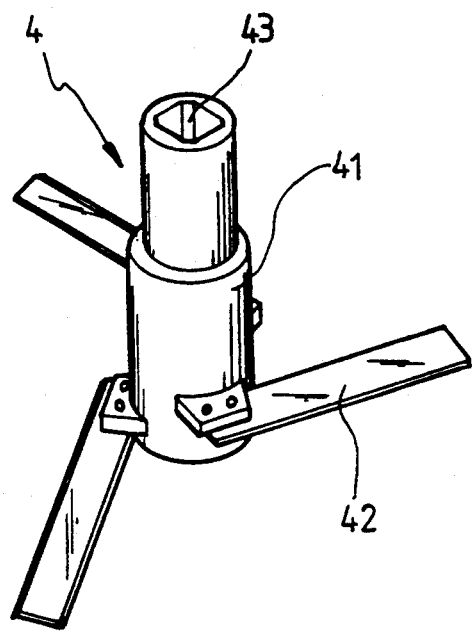
FIG. 3 is a perspective view of an embodiment of the slicer member of the present invention.

Further referring to FIG. 3, to slice food (not shown) disposed in the work bowl 1, the present invention provides a slicer member 4 which can be supported by the central support axle 11 of the work bowl 1 and comprises a central column 41 with a plurality of slicing blades 42 radially attached thereon at different axial locations (more clearly shown in FIG. 2). Similar to the central column 31 of the drainer basket 3, the slicer central column 41 also has an upper opening 43 complementary in shape and size with the polygonal cross-sectioned end of the central spindle 21 so as to be engageable therewith and rotated thereby. By rotating the crank handle 6, the central spindle 21 is rotated through the gear train 29 and in turn rotates the slicing blades 42 and thus slicing the food (not shown) disposed in the work bowl 1. It should be noted that disposing the slicing blades 42 at different axial locations of the central column 41 can enhance the slicing result.

Figure 4:
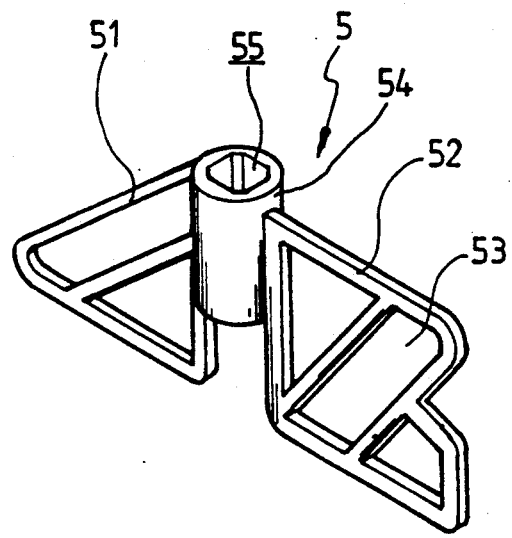
FIG. 4 is a perspective view of an embodiment of the mixer member of the present invention.

Further referring to FIG. 4, to mix food (not shown) disposed in the work bowl 1, the present invention provides a mixer member 4 which can be supported by the central support axle 11 of the work bowl 1 and comprises a central column 54 with a generally triangular mixing blades 51 and a generally rectangular blades 52 diametrically oppositely attached thereon. Similar to the central column 31 of the drainer basket 3, the mixer central column 54 also has an upper opening 55 complementary in shape and size with the polygonal cross-sectioned end of the central spindle 21 so as to be engageable therewith and rotated thereby. Each of the triangular and rectangular mixing blades 51 and 52 is provided with a plurality of passages 53 for having food pass therethrough and mix the food passing therethrough. By rotating the crank handle 6, the central spindle 21 is rotated through the gear train 29 and in turn rotates the mixing blades 51 and 52 and thus mixing the food (not shown) disposed in the work bowl 1.

It is apparent that although the invention has been described in connection with the preferred embodiment, it is contemplated that those skilled in the art may make changes to certain features of the preferred embodiment without departing from the spirit and scope of the invention as defined in the appended claims.

What is claimed is:

1. A food processor comprising:
   a work bowl having a bottom and a top opening with a central support axle extending from the bottom part way to the top opening;
   a cover having an outer surface, an inner surface and a side surface connecting the outer and inner surfaces together to form an interior to dispose therein a rotation transmitting means connecting a handle shaft which extends from the interior toward the outer surface and protrudes out of the outer surface to have a first end thereof detachably engaged by a crank handle and a central spindle which extends from the interior toward the inner surface and protrudes out of the inner surface to have a first end thereof having a polygonal cross section extend into the work bowl when the cover is mounted on the top opening of the work bowl; and
   at least a food processing member which is supported on the central support axle and guided thereby and has a central column with an upper opening engageable with the central spindle so that when the crank handle is manually rotated, the spindle rotates through the rotation transmitting means to have the food processing member rotated.

2. A food processor as claimed in claim 1 wherein said rotation transmitting means is a speed reduction gear train.

3. A food processor as claimed in claim 1 wherein said food processing member is a drainer basket.

4. A food processor as claimed in claim 3 further comprising a second food processing member which is a slicer member having a plurality of slicing blades radially mounted on the central column at different axial locations, said drainer basket and said slicer member being alternately used to process food in different ways.

5. A food processor as claimed in claim 4 further comprising a third food processing member which is a mixer member having a generally triangular mixing blade and a generally rectangular mixing blade diametrically oppositely mounted on the central column with a plurality of passages formed thereon to allow food to be mixed to pass therethrough, said drainer basket, said slicer member and said mixer member being alternately used to process food in different ways.

6. A food processor as claimed in claim 1 comprising three food processing members including a drainer basket, a slicer member having a plurality of slicing blades radially mounted on the central column at different axial locations, and a mixer member having a generally triangular mixing blade and a generally rectangular mixing blade diametrically oppositely mounted on the central column with a plurality of passages formed thereon to allow food to be mixed to pass therethrough, said drainer basket, slicer member and mixer member being alternately used to process food in different ways.

7. A food processor comprising:
   a work bowl having a bottom and a top opening with a central support axle extending from the bottom part way to the top opening;
   a cover having an outer surface, an inner surface and a side surface connecting the outer and inner surfaces together to form an interior to dispose therein a rotation transmitting means connecting a handle shaft which extends from the interior toward the outer surface and protrudes out of the outer surface to have a first end thereof detachably engaged by a crank handle and a central spindle which extends from the interior toward the inner surface and protrudes out of the inner surface to have a first end thereof having a polygonal cross section extend into the work bowl when the cover is mounted on the top opening of the work bowl;

a drainer basket which has a first central column to be supported by the central support axle of the work bowl and guided thereby, said first central column having a first upper opening engageable with the central spindle so that when the crank handle is manually rotated, the spindle rotates with the rotation transmitting means to have the drainer basket rotated;

a slicer member which has a second central column to be supported by the central support axle of the work bowl and guided thereby, said second central column having a second upper opening engageable with the central spindle so that when the crank handle is manually rotated, the spindle rotates with the rotation transmitting means to have the slicer member rotated, said slicer member having a plurality of slicing blades radially mounted on the second central column at different axial locations thereof; and a mixer member which has a third central column to be supported by the central support axle of the work bowl and guided thereby, said third central column having a third upper opening engageable with the central spindle so that when the crank handle is manually rotated, the spindle rotates with the rotation transmitting means to have the mixer member rotated, said mixer member having a generally triangular mixing blade and a generally rectangular mixing blade diametrically oppositely mounted on the third central column with a plurality of passages formed thereon to allow food to be mixed to pass therethrough; and wherein said drainer basket, slicer member and mixer member are alternately used to process food in different ways.

8. A food processor as claimed in claim 7 wherein said rotation transmitting means is a speed reduction gear train.

* * * * *